United States Patent [19]

Kimura

[11] 4,345,279
[45] Aug. 17, 1982

[54] TIME BASE CORRECTION APPARATUS

[75] Inventor: Kenji Kimura, Tachikawa, Japan

[73] Assignee: Olympus Optical Co., Ltd., Tokyo, Japan

[21] Appl. No.: 193,255

[22] Filed: Oct. 1, 1980

[30] Foreign Application Priority Data

Oct. 16, 1979 [JP] Japan .......................... 54-143165[U]
Oct. 16, 1979 [JP] Japan .......................... 54-143166[U]

[51] Int. Cl.³ ............................................ H04N 5/785
[52] U.S. Cl. .................................................... 360/36
[58] Field of Search .................... 358/127, 4, 160, 176; 360/33, 36

[56] References Cited

U.S. PATENT DOCUMENTS 3,767,849 10/1973 Wessels .............................. 360/36 X
4,228,460 10/1980 Rotter ................................. 358/127
4,300,172 11/1981 Sochor et al. ......................... 360/33

FOREIGN PATENT DOCUMENTS 52-52349 4/1977 Japan .
52-74216 6/1977 Japan .................................. 358/160

Primary Examiner—Bernard Konick
Assistant Examiner—Donald McElheny, Jr.
Attorney, Agent, or Firm—Frishauf, Holtz, Goodman & Woodward

[57] ABSTRACT

A time base correction apparatus comprising: a delay means (10) for providing a first signal (E3) as an input signal (E1) delay by a given time in accordance with a frequency of a clock signal (E2); a comparator (16) which compares a signal component (E4) contained in the first signal (E3) with a given comparison signal (E5) thereby to produce a second signal (E7) with a level corresponding to a phase difference between the signal component (E4) and the given comparison signal (E5); a VCO (12) for producing the clock signal (E2) depending on the level of the second signal (E7); and a compensator (20) which provides an output signal (E8) obtained by compensating variation components of the first signal (E3) so that the output signal (E8) exactly corresponds to the input signal (E1), depending on the first signal (E3) and the second signal (E7).

9 Claims, 16 Drawing Figures

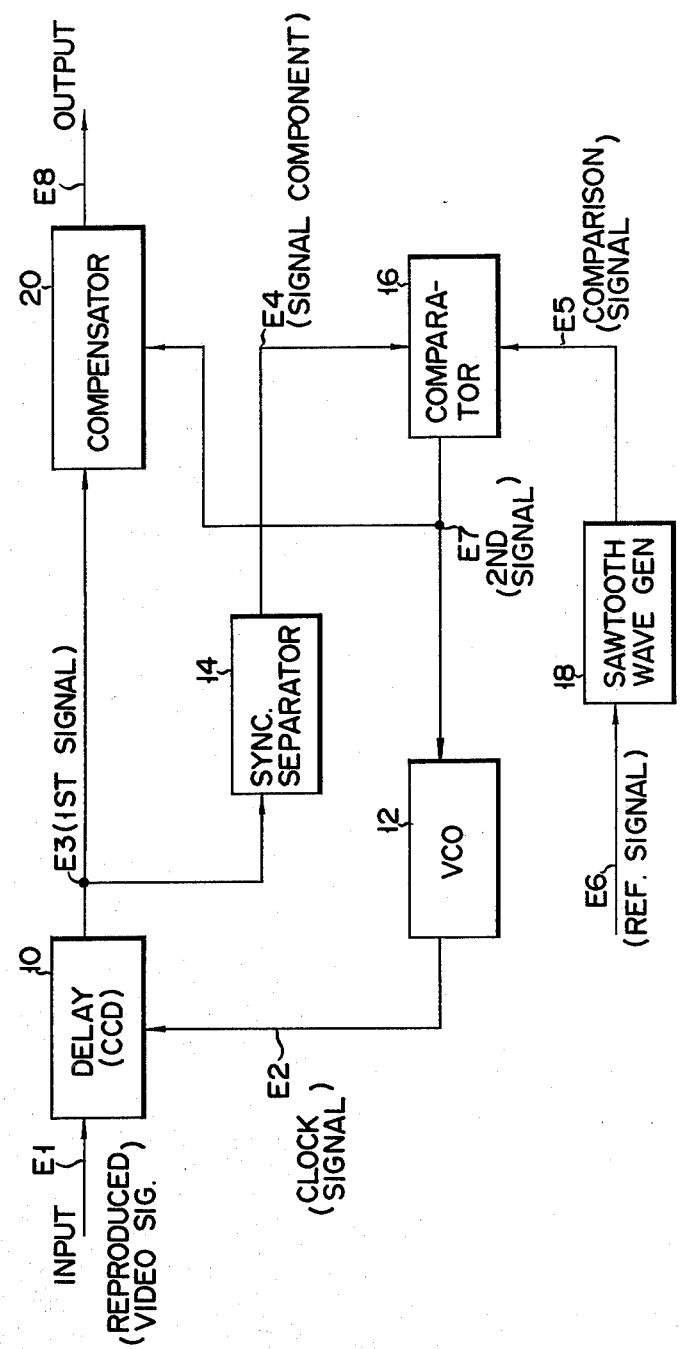
F I G. 1

TIME BASE CORRECTION APPARATUS

BACKGROUND OF THE INVENTION

The invention relates to a time base correction apparatus using a variable signal delay device such as a CCD (charge coupled device).

A reproduced video signal obtained from recording/playback apparatus such as a VTR (video tape recorder) usually contains jitter-drift components. For correcting the jitter-drift components, a time base correction apparatus using a variable delay device such as a CCD (charge coupled device) is considered to be effective. As one of those apparatuses, there is a single delay apparatus which is disclosed in Japanese Patent Public Disclosure No. 52349/77. This prior art delay apparatus uses a signal delay element such as a shift register, a BBD or a CCD for effecting the time base correction. When the CCD, for example, is used for the signal delay element, the time base correction is performed through the control of a delay time by changing a clock frequency for transferring an input signal of the CCD. In the time base correction apparatus based on such a time correction idea, the signal transfer efficiency is degraded as the transfer clock frequency becomes high. In other words, a delayed output signal level of the CCD is reduced as the transfer clock frequency becomes higher. Additionally, the prior time base correction apparatus has a disadvantage that a DC level and an amplitude of the CCD output signal vary with a change of the transfer clock frequency caused by the time-delay control. Thus, the apparatus is effective for the correction of the jitter-drift components attendant with a time or phase variation, but is ineffective for the correction of the DC level and amplitude variations. This means that the amplitude and the DC component of the CCD output signal may vary in synchronism with the period of jitter-drift. When the time base correction apparatus is applied to a VTR, for example, a video output signal applied from the VTR to a monitor TV accordingly varies to possibly cause flicker noise to appear on a CRT screen.

SUMMARY OF THE INVENTION

Accordingly, an object of the present invention is to provide a time base correction apparatus in which a corrected signal component is not influenced by the correcting operation for the jitter-drift components.

To achieve the above object, there is provided a time base correction apparatus comprising: a delay means for providing a first signal as an input signal delayed by a given time in accordance with a frequency of a clock signal; a comparator means connected to the delay means which compares a specific signal component contained in the first signal with a given comparison signal thereby to produce a second signal with a level corresponding to a phase difference between the signal component and the given comparison signal; a generator means connected to the delay means and the comparator means for producing the clock signal depending on a level of the second signal; and a compensation means connected to the delay means and the comparator means, which provides an output signal obtained by compensating variation components of the first signal so that the output signal exactly corresponds to the input signal.

The time base correction apparatus with such a circuit arrangement can correct a time base variation caused by the jitter-drift and a variation of the output signal due to the correction of the jitter-drift as well.

BRIEF DESCRIPTION OF THE DRAWINGS

FIG. 1 is a block diagram of an embodiment of a time base correction apparatus according to the present invention;

FIGS. 2A and 2B illustrate waveforms of signals E4 and E5 shown in FIG. 1;

DETAILED DESCRIPTION OF THE PREFERRED EMBODIMENTS

FIG. 1 shows a circuit configuration of the time base correction apparatus according to the invention when it is used for correcting a jitter and a flicker of a VTR reproduced video signal. Time delay control for compensating the jitter is performed by a CCD 10. Into the CCD 10 a reproduced video signal E1 applied by a VTR is inputted. Also into the CCD 10 a transfer clock signal E2 is applied from a voltage controlled oscillator (VCO) 12. The video signal E1 is delayed by a given time delay according to a frequency of the clock signal E2. The signal E1 delayed by the CCD 10 is inputted, in the form of a first signal E3, into a synchronized signal separator 14. The separator 14 separates a specific signal component, i.e. a horizontal synchronizing signal E4 from the first signal E3. The synchronizing signal E4 is inputted into a phase comparator 16. Into the phase comparator 16, a comparison signal E5 is further inputted. The comparison signal E5 is produced by a sawtooth wave generator 18. The generator 18 is triggered by a reference signal E6 for the time correction to generate the signal E5. Namely, the comparison signal E5 has a given period in synchronism with the reference signal E6.

Figure 2A:
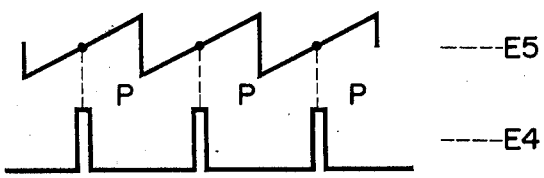

FIGS. 2A and 2B show a relation of the comparison signal E5 and the synchronizing signal E4. At a point P where the levels of the signals E5 and the E4 are coincident with each other, the comparator 16 produces a second signal E7. The second signal E7 has a signal level held at a level corresponding to the level-coincident point. The holding operation of the signal E7 is performed every period of the reference signal E6. The signal level of the second signal E7 corresponds to a phase difference between the signal E4 and the signal E5. The second signal E7 is inputted into the VCO 12. The VCO 12, according to the signal level of the second signal E7, changes the frequency of the transferring clock signal E2.

Figure 3A:
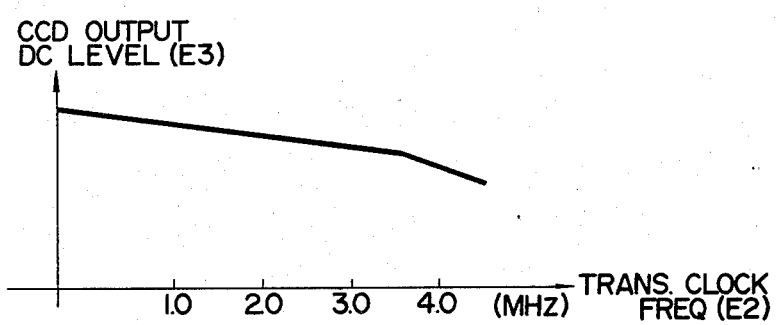
FIG. 3A is a graphical representation of a relation between a frequency of a signal E2 shown in FIG. 1 and a level (DC component) of a signal E3.
Figure 3B:
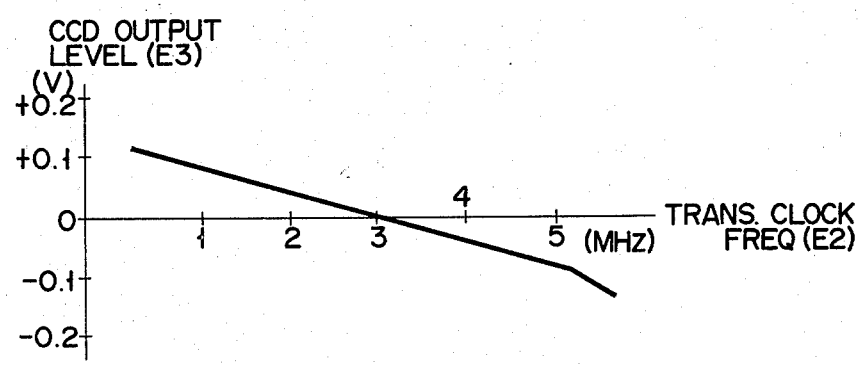
FIG. 3B is a graphical representation of a relation between a frequency of the signal E2 shown in FIG. 1 and a level (amplitude) of the signal E3.

The circuit components 10 through 16 form a negative feedback loop. With a sufficient loop gain of the negative feedback loop, the first signal E3 constantly keeps a fixed phase difference with respect to the reference signal E6. However, if the loop gain is too high, a lock out phenomenon occurs at the moment of transients such as drop-out. Therefore, it is necessary to select an optimum negative feedback loop gain. By the above negative feedback operation, the jitter-drift component is removed from the first signal E3. However, the first signal E3 contains variations of the DC level and the amplitude which correspond to the frequency of the clock signal E2 or the signal level of the second signal E7. FIG. 3A is a graphical representation of a relation of the frequency of the clock signal E2 and the signal level (DC component) of the first signal E3. This graph shows that the higher the frequency of the transferring clock, i.e. the shorter the delay time in the CCD 10, the lower the DC level of the first signal E3. FIG. 3B is a graphical representation of a relation of the frequency of the clock signal E2 and the signal level of the first signal E3. This graph shows that the higher the frequency of the transferring clock, the lower the level or the amplitude of the first signal E3. The transfer clock frequency corresponds to the signal level of the second signal E7. Therefore, it is possible to cancel the reduction of the DC level or the amplitude of the first signal E3 by using the second signal E7. The canceling operation is made in a compensator 20. The first signal E3 and the second signal E7 are inputted into the compensator 20 where the DC variation or the amplitude variation of the first signal E3, that is, a flicker component, is canceled by the second signal E7.

Figure 4:
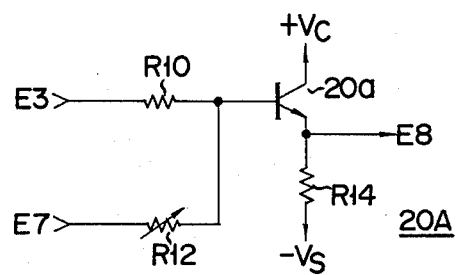
FIG. 4 is a circuit diagram of a detailed compensating circuit shown in FIG. 1.
Figure 5A:
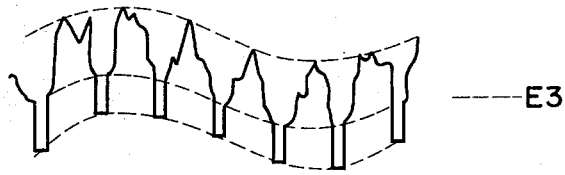
FIGS. 5A to 5C are a set of waveforms of the signals E3, E7 and E8.
Figure 5B:
Figure 5C:

FIG. 4 shows a detailed circuit 20A of the compensator 20. FIGS. 5A to 5C are waveforms of the signals E3 and E7, and the video output signal E8 outputted from the compensator 20. In FIG. 4, the first signal E3 with the DC level variation as shown in FIG. 5A, is applied to the base of an NPN transistor 20a, through a resistor R10. The collector of the transistor 20a is connected to positive power source +Vc and the emitter thereof is connected to a negative power source −Vs, through a resistor R14. The second signal E7, as shown in FIG. 5B, is applied to the base of the transistor 20a through an adjustable resistor R12. The signals E3 and E7 combined here are outputted from the emitter of the transistor 20a in the form of the compensated video signal E8. The first signal E3 and the second signal E7 have the same periods but the opposite phases. Therefore, by adjusting the resistor R12, a video signal E8 having only a small DC level variation, as shown in FIG. 5C, is obtainable. The signal E3, after being subjected to the jitter-compensation in the CCD 10, is further subjected to the flicker canceling, so that the output signal E8 does not include the jitter and the flicker.

Figure 6:
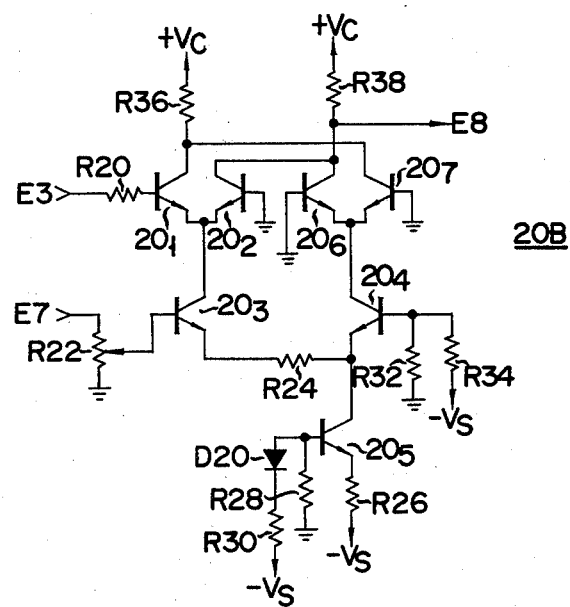
FIG. 6 is a circuit diagram of another detailed compensating circuit.
Figure 7A:
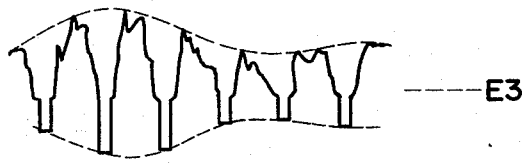
FIGS. 7A to 7C show a set of waveforms of the signals E3, E7 and E8.
Figure 7B:
Figure 7C:

FIG. 6 shows another detailed circuit 20B of the compensator 20. FIGS. 7A to 7C show waveforms of the video output signal E8 outputted from the compensator 20, and the signals E3 and E7.

In FIG. 6, the first signal E3 with the amplitude variation, as shown in FIG. 7A, is applied to the base of an NPN transistor $20_1$ through a resistor R20. The emitter of the transistor $20_1$, together with the emitter of an NPN transistor $20_2$, is connected to the collector of an NPN transistor $20_3$. The second signal E7 as shown in FIG. 7B is supplied to the base of the transistor $20_3$ through an adjustable resistor R22. The emitter of the transistor $20_3$ is connected to the emitter of an NPN transistor $20_4$ through a resistor R24. The emitter of the transistor $20_4$ is connected to the collector of an NPN transistor $20_5$. The emitter of the transistor $20_5$ is connected to a negative power source −Vs through a resistor R26. The base of the transistor $20_5$ is grounded through a resistor R28 and connected to the power source −Vs, through a temperature-compensation diode D20 and a resistor R30.

The base of the transistor $20_4$ is grounded through a resistor R32 and connected to the power source −Vs through a resistor R34. The collector of the transistor $20_4$ is connected to emitters of NPN transistors $20_6$ and $20_7$. The bases of the transistors $20_2$, $20_6$ and $20_7$ are grounded. The collectors of the transistors $20_1$ and $20_7$ are connected to a positive power source +Vc through a resistor R36. The collector of the transistor $20_2$, together with the collector of the transistor $20_6$, is connected to the power source +Vc through a resistor R38. From the collectors of the transistors $20_2$ and $20_6$, the compensated video signal E8 is derived.

A level variation of the first signal E3 inputted into the base circuit of the transistor $20_1$, is caused by a frequency change of the transfer clock signal E2. Therefore, an envelope of the first signal E3 has same period as the second signal E7. Let us consider the positive envelope of the first signal E3 inputted into the base of the transistor $20_1$. The collector current of the transistor $20_2$ decreases as a positive envelope level of the first signal E3 becomes higher. At this time, a positive half-period of the second signal E7 has been inputted into the base of the transistor $20_3$. Accordingly, a collector current of the transistor $20_3$, i.e. the sum of the collector currents of the transistors $20_1$ and $20_2$, increases as a positive level of the second signal E7 increases. Consequently, the decrease of the collector current of transistor $20_2$ is offset by the increase of the collector current of the transistor $20_3$. Conversely, when the envelope level of the signal E3 decreases and the collector current of the transistor $20_2$ increases, the increase is offset by the decrease of the collector current of the transistor $20_3$. The same thing is true for a negative envelope of the first signal E3. As described above, by adjusting the adjustable resistor R22 properly, the video output signal E8 having only a small level variation, i.e. the flicker component, is obtainable, as shown in FIG. 7C.

Specifically, the input signal E1 which is jitter-compensated by the CCD 10 is further flicker-compensated by the compensator 20. In this way, the output signal E8 not including the jitter and the flicker is formed. Accordingly, by using the time base correction apparatus as shown in FIG. 1, the flicker inherent to the delay circuit using a CCD or the like may be removed, whereby a good quality picture reproduced is obtainable.

Figure 8:
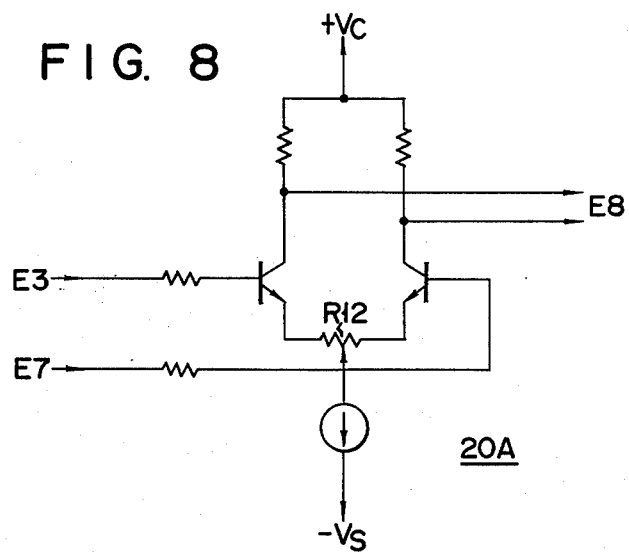
FIGS. 8 and 9 show modifications of the circuit 20A shown in FIG. 4.
Figure 9:
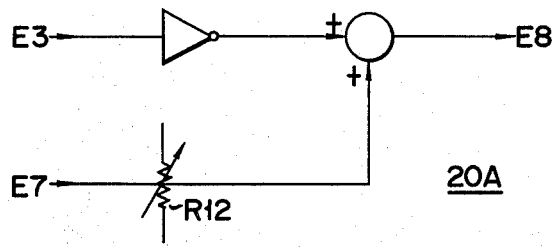
Figure 10:
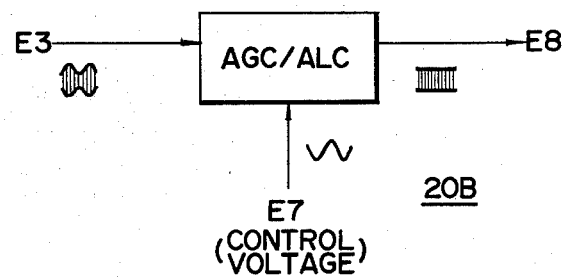
FIG. 10 shows a modification of the circuit 20B shown in FIG. 6.

It is apparent to those persons skilled in the art that the present invention is not limited to the embodiments described thus far referring to accompanying drawings, and that the present invention may be variously changed or modified within the scope of the present invention. For example, when the DC component of the signal E3 and the signal E7 are in phase, the circuit 20A of FIG. 4 may be constructed by a differential amplifier circuit, as shown in FIG. 8. Alternatively, as shown in FIG. 9, it may also be constructed by the combination of an inverter and an adder. The circuit 20B of FIG. 6 may be constructed by, as shown in FIG. 10, an AGC or an ALC circuit having a variable impedance element such as an FET or CdS which circuit is controlled by the signal E7. Further, the CCD 10 of FIG. 1 may be replaced by another delay device such as a BBD, a shift register or the like.

What is claimed is:

1. A time base correction apparatus for operating on an input signal including jitter and level variation components, comprising:

delay means responsive to said input signal for providing a first signal delayed by a given time in accordance with a frequency of a clock signal, said first signal corresponding to said first signal minus the jitter but including level variation components;

comparator means connected to said delay means for comparing a specific signal component contained in said first signal with a given comparison signal to thereby produce a second signal having a level corresponding to a phase difference between said specific signal component and said given comparison signal;

generator means connected to said delay means and to said comparator means for producing said clock signal as a function of a level of said second signal; and level variation compensation means including signal combining means connected to said delay means and to said comparator means for providing an output signal obtained by compensating level variation components of said first signal by combining said first and second signals so that said second signal cancels a DC level change of said first signal caused by time-delay operation in said delay means so that said output signal exactly corresponds to said input signal but without said jitter and level variation components.

2. A time base correction apparatus for operating on a input signal including jitter and level variation components, comprising:

delay means responsive to said input signal for providing a first signal delayed by a given time in accordance with a frequency of a clock signal, said first signal corresponding to said first signal minus the jitter but including level variation components;

comparator means connected to said delay means for comparing a specific signal component contained in said first signal with a given comparison signal to thereby produce a second signal having a level corresponding to a phase difference between said specific signal component and said given comparison signal;

generator means connected to said delay means and to said comparator means for producing said clock signal as a function of a level of said second signal; and level variation compensation means including modulator means connected to said delay means and to said comparator means for amplitude modulating said first signal by said second signal so that said second signal cancels an amplitude variation of said first signal caused by time-delay operation in said delay means to thereby provide an output signal which exactly corresponds to said input signal but without said jitter and level variation components.

3. The time base correction apparatus of claim 1 or 2, further comprising separator means connected to said delay means and to said comparator means for separating said specific signal component from said first signal and for supplying said specific signal component to said comparator means.

4. The time base correction apparatus of claim 1 or 2, further comprising second generator means connected to said comparator means for providing said given comparison signal at a given timing.

5. The time base correction apparatus of claim 1 or 2, further comprising:

separator means connected to said delay means and to said comparator means for separating said specific signal component from said first signal; and second generator means connected to said comparator means for providing said given comparison signal at a given timing.

6. The time base correction apparatus of claim 1 or 2, wherein said input signal is a reproduced video signal reproduced from a video tape recorder, said specific signal component is a synchronizing signal contained in said reproduced video signal, and said given comparison signal is a sawtooth wave signal synchronized with said synchronizing signal.

7. The time base correction apparatus of claim 3, wherein said input signal is a reproduced video signal reproduced from a video tape recorder, said specific signal component is a synchronizing signal contained in said reproduced video signal, and said given comparison signal is a sawtooth wave signal synchronized with said synchronizing signal.

8. The time base correction apparatus of claim 4, wherein said input signal is a reproduced video signal reproduced from a video tape recorder, said specific signal component is a synchronizing signal contained in said reproduced video signal, and said given comparison signal is a sawtooth wave signal synchronized with said synchronizing signal.

9. The time base correction apparatus of claim 5, wherein said input signal is a reproduced video signal reproduced from a video tape recorder, said specific signal component is a synchronizing signal contained in said reproduced video signal, and said given comparison signal is a sawtooth wave signal synchronized with said synchronizing signal.

* * * * *